United States Patent [19]

Amatangelo

[11] Patent Number: 4,948,039
[45] Date of Patent: Aug. 14, 1990

[54] PLASTIC BOX

[76] Inventor: David A. Amatangelo, 3911 Ridgewood Dr., Erie, Pa. 16506

[21] Appl. No.: 357,209

[22] Filed: May 26, 1989

[51] Int. Cl.⁵ .................... B65D 5/22; B65D 25/00
[52] U.S. Cl. .................... 229/198; 220/418; 220/437; 220/445; 229/DIG. 4
[58] Field of Search .......... 229/125, 39, 198, DIG. 2, 229/DIG. 4; 220/416, 418, 6, 7, 72, 437, 445

[56] References Cited

U.S. PATENT DOCUMENTS

| | | | |
|---|---|---|---|
| 1,083,114 | 12/1913 | Maier | 229/198 |
| 2,032,373 | 3/1936 | Mellers et al. | 229/198 |
| 2,200,320 | 5/1940 | Zalkind | 229/198 |
| 2,634,046 | 4/1953 | Weber | 229/DIG. 4 |
| 3,111,254 | 11/1963 | Thyen | 229/44 |
| 3,509,005 | 4/1970 | Hartig | 229/3.5 R |
| 3,642,550 | 2/1972 | Doll | 229/3.5 R |
| 3,853,239 | 12/1974 | Meller et al. | 220/1.5 |
| 3,866,782 | 2/1975 | Westfall | 215/253 |
| 3,910,485 | 10/1975 | Wandel | 229/DIG. 2 |
| 4,274,541 | 6/1981 | Festag et al. | 206/613 |
| 4,435,028 | 3/1984 | Rivkin | 312/258 |
| 4,441,639 | 4/1984 | Craw et al. | 224/237 |
| 4,489,815 | 12/1984 | Martinez et al. | 190/1 |
| 4,556,167 | 12/1985 | Fox et al. | 229/125.39 |
| 4,603,791 | 8/1986 | Spierer et al. | 220/404 |
| 4,763,833 | 8/1988 | Stoll | 229/DIG. 2 |
| 4,776,481 | 10/1988 | Kidd | 229/120.33 |

Primary Examiner—Gary E. Elkins
Attorney, Agent, or Firm—Charles L. Lovercheck; Wayne L. Lovercheck; Dale Lovercheck

[57] ABSTRACT

A container that can be collapsed and returned to the sender for re-use. The container is made of a flat thermoplastic board comprised of a first sheet and a second sheet held in spaced relation to one another by webbing. A single sheet may be 0.020 inches thick more or less. The container has square corners, is strong and durable. The container has sides and ends formed by cutting one sheet, leaving the other for a hinge and attaching the sides and ends by means of Velcro.

11 Claims, 2 Drawing Sheets

PLASTIC BOX

BACKGROUND OF THE INVENTION

This invention relates to packing cases, more particularly to returnable packing cases sometimes referred to as returnable dunnage.

Packaging for the shipment of various products is expensive. Returnable packing cases are frequently used, but because of their bulk, it is impractical to return most shipping cases for re-use. Large cardboard boxes and wooden crates cannot be returned because of the relative volume of the container compared to the volume occupied by such containers. Moreover, rigid crates do not generally protect products well because of their rigid nature. Foldable wooden boxes are expensive and heavy.

REFERENCE TO PRIOR ART

Applicant is familiar with the following United States Patents, none of which show an idea of a collapsible shipping container that can be collapsed for return and re-use.
- U.S. Pat. No. 3,111,254 to Thyen
- U.S. Pat. No. 3,853,239 to Meller et al
- U.S. Pat. No. 3,866,782 to Westfall
- U.S. Pat. No. 4,274,541 to Festag et al
- U.S. Pat. No. 4,435,028 to Rivkin
- U.S. Pat. No. 4,441,639 to Craw et al
- U.S. Pat. No. 4,603,791 to Spierer et al
- U.S. Pat. No. 4,489,815 to Martinez et al

STATEMENT OF THE INVENTION

Applicant has discovered that by using material known as fluted plastic and connecting the parts by integral hinges, a collapsible, reusable shipping container that has energy absorbing ability to protect the lading aginst damage can be made for use as dunnage that is simple in construction, economical to manufacture, simple and efficient to use and easily collapsible to be returned in compact form to the sender for re-use.

Applicant has discovered that a single sheet of plastic can function as a hinge and that most people are surprised that the single sheet when connecting two panels of shipper containers has sufficient strength to function as a hinge to hold the container together. The single type of hinge has several advantages over a scored line, such as used to form fold lines in cardboard container technology where the cardboard is crushed along the lines where sides and bottom joints are needed. A scored line commonly used in making cardboard boxes provides a somewhat irregular hinge line. The scored line at corners is used because if the paper sheet of one side of a corrugated cardboard were cut to form a corner as in Applicant's container, the joint would be unduly weakened. It is commonly accepted that one sheet of paper of a cardboard container would not be strong enough to function as a hinge and the fluted plastic appears to the ordinary person to be analogous to cardboard. It has not been apparent to persons in the art that a satisfactory hinge can be made in a fluted plastic, having webs between two plastic sheets, by slitting one of the plastic side sheets and allowing the other sheet to function as a hinge. The average person knows that such a hinge on a cardboard sheet will not be strong enough to be practical and such persons likewise believe that fluted plastic also would not be strong enough to be practical. Applicant has discovered that one of the cover sheets of plastic, of a fluted plastic panel, is adequate to form the hinges for most packaging purposes.

The embodiment of the invention shown in FIGS. 4 and 5 shows a hinge made in fluted plastic wherein the outside sheet is slitted.

The embodiment of the invention shown in FIGS. 6 and 7 shows a hinge made in fluted plastic sheets wherein the inside sheet is cut and small portion of the flutes are left in place.

The embodiment of the invention shown in FIGS. 6 and 7 has certain advantages because the remaining parts of the webs add additional strength to the joints and the sheet at the outer edge of the sheet provides a smoother radiused corner for the container.

OBJECTS OF THE INVENTION

The object of this invention is to provide an improved shipping container.

Another object of the invention is to provide a shipping container in combination with a unique type of hinge.

Another object of the invention is to provide a shipping container that is simple in construction, economical to manufacture, simple and efficient to use, easily collapsible and reusable.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWINGS

Figure 1:
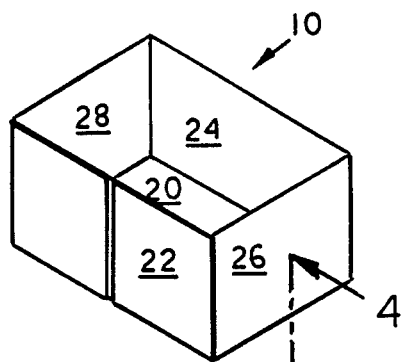
FIG. 1 is an isometric view of a shipping container according to the invention.
Figure 2:
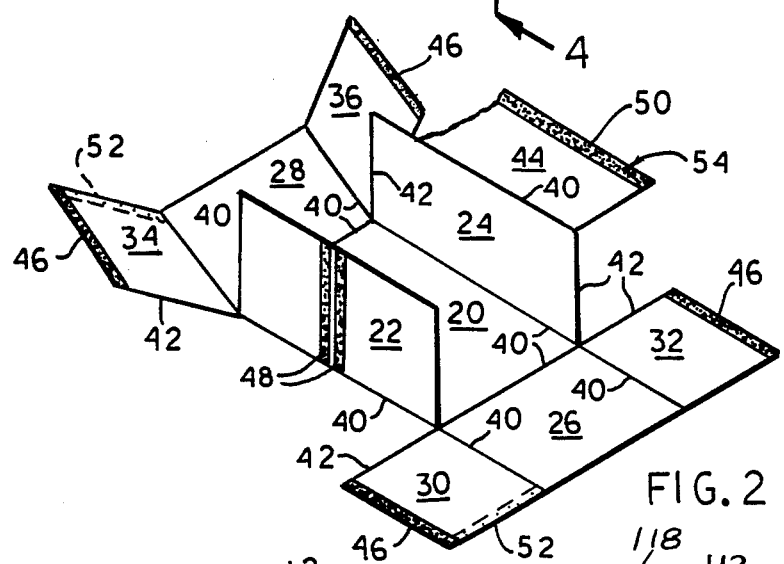
FIG. 2 is a view of the shipping container showing it with partly folded out parts.

Now with more specific reference to the drawings, returnable container 10 is adapted to be used to carry lading for shipment by trucks or otherwise and to be dismantled and folded flat when empty for economical storage and shipment.

Container 10, according to the invention shown in FIGS. 1 through 4, is made of a flat sheet or panel 12 of a thermoplastic material such as polyethylene, vinyl, polystyrene, polypropylene or like material. Panel 12 has relatively thin first sheet 14 on one side and relatively thin second sheet 16 on the opposite side. First sheet 14 and second sheet 16 are held in spaced parallel relation to one another by a plurality of relatively closely spaced containing webs 18. Webs 18 may be spaced from one another a distance approximately equal to the distance between first sheet 14 and second sheet 16. Webs 18 may be bent at an intermediate part so that they do not extend directly in a straight line from first sheet 14 to second sheet 16, but may be curved or angular as shown, thereby giving some resiliency between sheets 14 and 16 to protect the contents. Container 10 has at least bottom 20, first side 22, second side 24, first end 26, second end 28, first end flap 30, second end flap 32, third end flap 34, fourth end flap 36, and cover 44 with cover flap 54. First sheet 14 and second sheet 16, as well as webs 18, may be relatively thin, for example, about 0.020 inches more or less, depending on the application.

Figure 3:
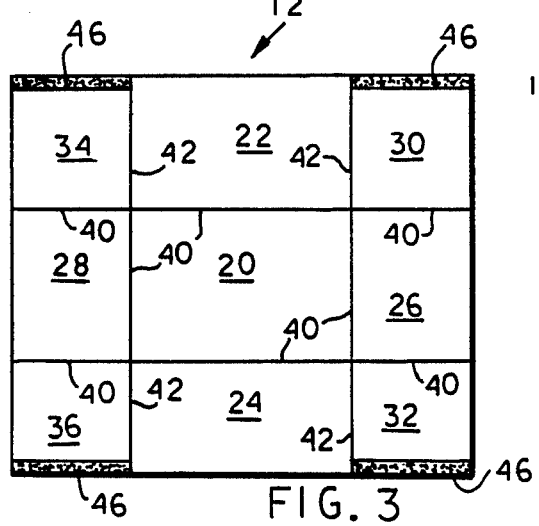
FIG. 3 is a top view of the container panels lying flat.
Figure 4:
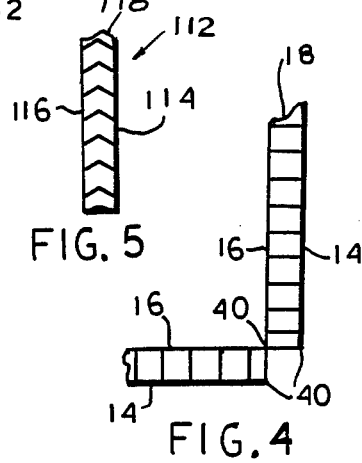
FIG. 4 is a partial cross-sectional view taken on line 4—4 of FIG. 1.

It will be seen that container 10 can easily be assembled by folding first side 22 and second side 24 up, by folding first end flap 30, second end flap 32, third end flap 34 and fourth end flap 36 up then connecting first Velcro strips 46 to second Velcro strips 48, and connecting third Velcro strips 50, of cover 44, to fourth Velcro strips 52. Container 10 can be easily dismantled into a flat condition, for storage and shipping, by releasing first Velcro strips 46 from second Velcro strips 48, and by releasing third Velcro strips 50 from fourth Velcro strips 52, as shown in FIG. 3.

In the manufacture of container 10, only first sheet 14 is cut along first lines 40. First sheet 14 and second sheet 16 are both cut along second lines 42. Cover 44 and cover flap 54 are likewise formed by cutting first sheet 14 along first line 40.

Figure 5:
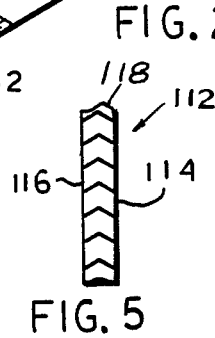
FIG. 5 is a partial view showing another embodiment of the panel.

FIG. 5 shows another embodiment of the invention of panel 112 having first sheet 114 and second sheet 116 connected by webs 118, which are V-shaped so that they bend when a pressure is expended on the side of the panel and thus give some resiliency to panel 112.

Figure 6:
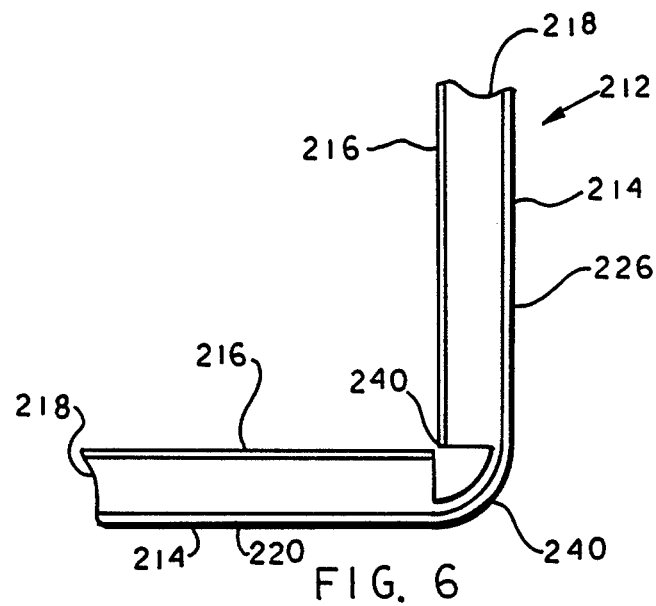
FIG. 6 is an isometric view of another embodiment of the invention.
Figure 7:
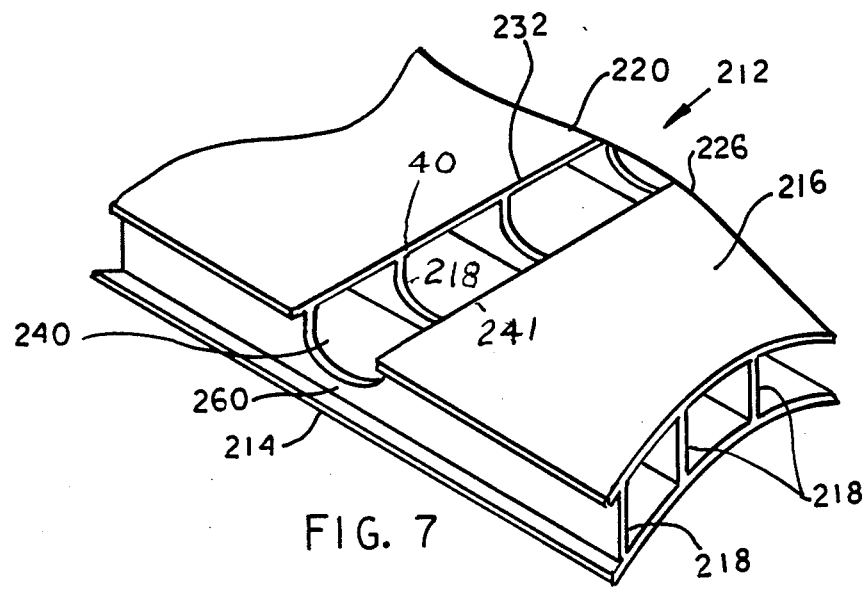
FIG. 7 is a view similar to FIG. 4 the embodiment of the invention shown in FIG. 6.

In the embodiment of FIGS. 6 and 7 panels 212 are like panels 12 or panels 112 in the first two embodiments. In the embodiment of FIGS. 6 and 7, first sheet 216 is cut instead of second sheet 214 so that hinge 240 is formed by first sheet 214 to form a hinge between bottom 220, sides 224, ends 226 and flaps 230. A section of inner sheet 216 is removed slightly less in length than the thickness of panels 212. The section removed may be approximately three fourths of the thickness of the panels so that about one fourth of the web remains as at 260. This provides an arcuate hinge 240. The ends, sides, flaps and cover are then folded up perpendicular to bottom 220 so that first edge 230 engages second edge 232 forming hinge 240 as shown in FIG. 6, thereby forming a container like that shown in FIGS. 1 and 2.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A returnable container adapted to be assembled to contain a product,
    said container adapted to be folded flat when empty for economical storage and shipment,
    said container comprising a flat panel having a first sheet on one side and a second sheet on the opposite side,
    said first sheet and said second sheet being held in spaced parallel relation to one another by a plurality of spaced connecting webs integrally connected to said first sheet and to said second sheet,
    said container having at least a bottom, a first side, a secon side, a first end and a second end,
    said first sheet being cut along first lines between said bottom, said first side, said second side, said first end and said second end,
    said first end and said second end each having removable first fastening means attached thereto,
    said first side and said second side each having removable second fastening means attached thereto,
    said removable first fastening means adapted to be attached to said removable second fastening means of said first side and said second side whereby said first end and said second end may be attached to said first side and to said second side holding said container in a closed position.

2. The container recited in claim 1 wherein said first sheet and said second sheet being cut along second lines defining ends of said first side and said second side,
    said first sheet only being cut along said first lines between said first end and said first end flap and said second end flap and,
    said first sheet only being cut between said second end and said third end flap and said fourth end flap thereby forming a first end flap, a second end flap, a third end flap and a fourth end flap.

3. The container recited in claim 1 wherein said flat panel includes a cover,
    said first sheet being cut along said first line between said cover and either one of said first side or said second side.

4. The container recited in claim 3 wherein said removable first fastening means is attached along one edge of each said end flaps adapted to cooperate with said removable second fastening means on said first side and on said second side whereby said container can be held in use position and,
    said removable first fastening means and said removable second fastening means adapted to be released allowing said first side and said second side to resume their flat planar relation for return to be reused.

5. The container recited in claim 4 wherein said removable first fastening means and said removable second fastening means comprises "Velcro" material.

6. The container recited in claim 3 wherein said first sheet on one side of said flat panel and said second sheet on said other side of flat panel and said webs are less than 0.020 inches thick.

7. The container recited in claim 1 wherein said second sheet is cut along second lines spaced from said first lines a distance approximately equal to the distance between said first sheet and said second sheet and the part of said webs are removed adjacent said first sheet to a distance from said first sheet about three fourths of the distance toward said second sheet providing a clearance space for folding said sides and said ends relative to said bottom.

8. The container recited in claim 1 wherein said first sheet is disposed on the outside of said container.

9. The container recited in claim 8 wherein a section of said webs adjacent said second sheet and adjacent said bottom and said sides and adjacent said ends is not removed.

10. The container recited in claim 9 wherein said section of said webs of said first sheet of a width about equal to the distance between said first sheet and said second sheet is removed.

11. The container recited in claim 1 wherein said first sheet is cut along a second line spaced from said first lines a distance about equal to the distance between said first sheet and said second sheet.

* * * * *